(12) United States Patent
Gasbarro (10) Patent No.: US 7,364,504 B2
(45) Date of Patent: Apr. 29, 2008

(54) APPARATUS AND METHOD FOR PRODUCING CONTROLLED PORTIONS OF MEAT PRODUCTS

(75) Inventor: Geno N. Gasbarro, Columbus, OH (US)

(73) Assignee: Remington Holdings LLC, Columbus, OH (US)

( * ) Notice: Subject to any disclaimer, the term of this patent is extended or adjusted under 35 U.S.C. 154(b) by 82 days.

(21) Appl. No.: 10/844,165

(22) Filed: May 12, 2004

(65) Prior Publication Data

US 2005/0048893 A1 Mar. 3, 2005

Related U.S. Application Data

(60) Provisional application No. 60/499,461, filed on Sep. 2, 2003.

(51) Int. Cl.
*A22C 17/02* (2006.01)

(52) U.S. Cl. .................. 452/156; 452/155

(58) Field of Classification Search ........... 452/149, 452/150, 151, 152, 153, 155, 156, 163, 165, 452/170, 177, 179
See application file for complete search history.

(56) References Cited

U.S. PATENT DOCUMENTS 1,807,448 A * 5/1931 Soderberg ............... 452/149
1,992,714 A * 2/1935 Nelson .................... 83/407
2,431,465 A * 11/1947 Christiansen ............. 452/149
3,570,050 A * 3/1971 Draper et al. ............. 452/149
4,476,610 A * 10/1984 Wenzel .................... 452/170
4,800,626 A * 1/1989 Wastell .................... 452/110
4,837,895 A * 6/1989 Emsens .................... 99/419
5,358,441 A * 10/1994 Hjorth ..................... 452/180

FOREIGN PATENT DOCUMENTS

JP 60-207543 * 10/1985

* cited by examiner

*Primary Examiner*—David Parsley
(74) *Attorney, Agent, or Firm*—Jason H. Foster; Kremblas, Foster, Phillips & Pollick (57) ABSTRACT

An apparatus for producing multiple portions of meat. A plurality of product mandrels having an open-top recess are mounted on a conveyor for travel along a selected path. The mandrels are selectively rotatable about a vertical axis. Two sets of parallel slots are provided in the mandrel and extend to a depth at least equal to the depth of the recess. Each set of parallel slots is disposed to intersect the other at a selected angle. Each product mandrel is moved through a pair of cutting stations which carry laterally spaced knives extending downwardly. The product mandrel is rotated through an angle which aligns one set of intersecting slots parallel to the knife blades in a cutting station after passing through the other cutting station. A plurality of laterally spaced cuts are made through the larger piece of meat to produce smaller portions.

2 Claims, 12 Drawing Sheets

APPARATUS AND METHOD FOR PRODUCING CONTROLLED PORTIONS OF MEAT PRODUCTS

CROSS-REFERENCES TO RELATED APPLICATIONS

This application claims the benefit of U.S. Provisional Application No. 60/499,461 filed Sep. 2, 2003.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

The present invention relates generally to food processing apparatus and methods and particularly to an apparatus and method for making a plurality of selectively sized portions from a larger piece of meat.

2. Description of the Related Art

The food industry has for many years relied upon making several smaller pieces or portions from a larger piece of meat. Typically, this process was done by manual cutting of the larger portion into smaller pieces. This process was very labor intensive and lacked a level of consistency in the size, shape and weight of the smaller portions produced. In the food service or restaurant business, selective consistently sized portions have become very popular. This is particularly true as applied to poultry breast or beef products wherein smaller chunks or cube-like pieces are prepared from a larger cut of meat and a selective number of such pieces produced are sold in single servings. In view of this practice it is highly desirable to make each piece as consistent in size and weight as possible. This creates a better customer image and provides a higher degree of control of costs relative to the weight of product sold.

Many prior attempts have been made to create an automated machine to perform the cutting and sizing functions. Some of these attempt have met with some improvement over the manual cutting process. However, a simple to construct automated machine providing improved efficiency, consistency in results and relative ease to adapt to different portion sizes and to different shapes of the initial larger meat portions to be cut up has eluded those skilled in this art prior to the present invention.

BRIEF SUMMARY OF THE INVENTION

The present invention relates to an automated portion control apparatus for cutting a larger piece of meat into discrete, consistently sized portions.

In accordance with the preferred embodiment of the present invention, a plurality of product mandrels or carrier blocks are mounted on a conveyor for travel along a selected path. Each mandrel includes a recess having a shape selected to most efficiently receive the larger pieces of meat which are to be cut into pieces of a selected size and weight.

A plurality of slots are provided in each carrier block which extend through the upper surface of the block to a depth at least equal to the bottom surface of the recess. The slots are arranged in a predetermined pattern wherein one set of slots extend in a direction parallel to the intended path of travel and the other set of slots extend across the first set at a selected angle thereto. Usually, the angle is approximately ninety degrees if one chooses to create smaller sized portions having a generally a rectangular or cube-like shape.

The carrier blocks are mounted on the conveyor for selected pivotal movement at a point along the path of travel to align the slots parallel to the path of travel prior to encountering a plurality of knife blades fixed in one of a pair of cutting Blocks which are mounted in spaced relationship along the path of travel. The knife edges are laterally spaced from one another across the path of travel of the carrier blocks and aligned to enter the set of slots which are aligned parallel thereto to engage and cut the meat product carried in the recess.

The number of knife edges employed and the angular relationship between the two sets of slots and their spacing determine the size and shape of the final portions of the original larger meat product.

The cutting blocks are constructed to form a passage or channel through which the carrier blocks travel and include a surface which functions to close the open top recess as the carrier block passes through the cutting block passage. This serves to confine the initial large piece of meat within a selective volume defined by the recess during the cutting action of the knives.

The result obtained is more consistent control of the size and weight of the selected cut portions and less waste in the form of odd-shaped and/or underweight or overweight pieces of the final product.

Therefore it is an object of the present invention to provide a more efficient, high volume, automated meat processing apparatus which produces selectively cut portions of meat in a reliably controlled manner.

It is another object of the present invention to provide an apparatus of the type described which is relatively easy to adapt to a great variety of sizes and shapes of the initial larger piece of meat, as well as to the size and shape of the individual portions cut from the initial larger piece of meat.

It is a further object of the present invention to provide an apparatus of the type described which is relatively simple to manufacture and operate safely.

It is yet another object of the present invention to provide an apparatus of the type described which improves the effectiveness of controlling the size and weight of the meat portions produced to improve the economic benefits to the wholesaler and their retail customers.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 1:
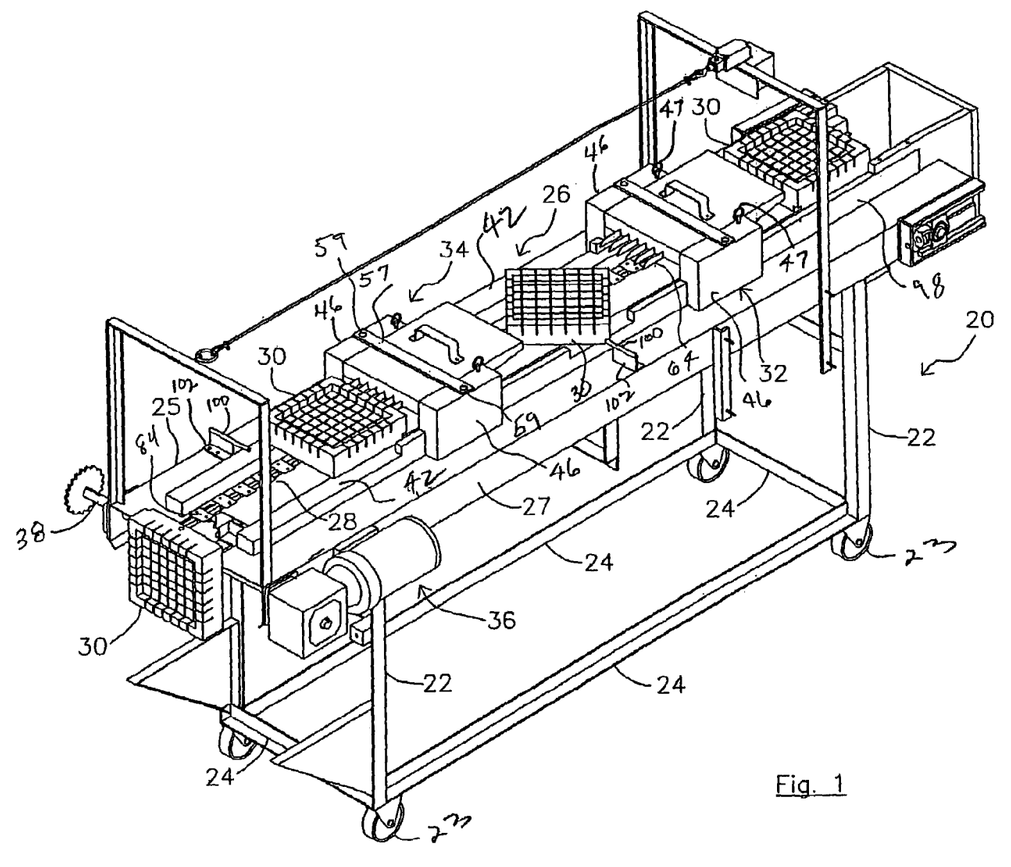
FIG. 1 is a perspective view of a preferred embodiment of a cutting apparatus constructed in accordance with the present invention.
Figure 2:
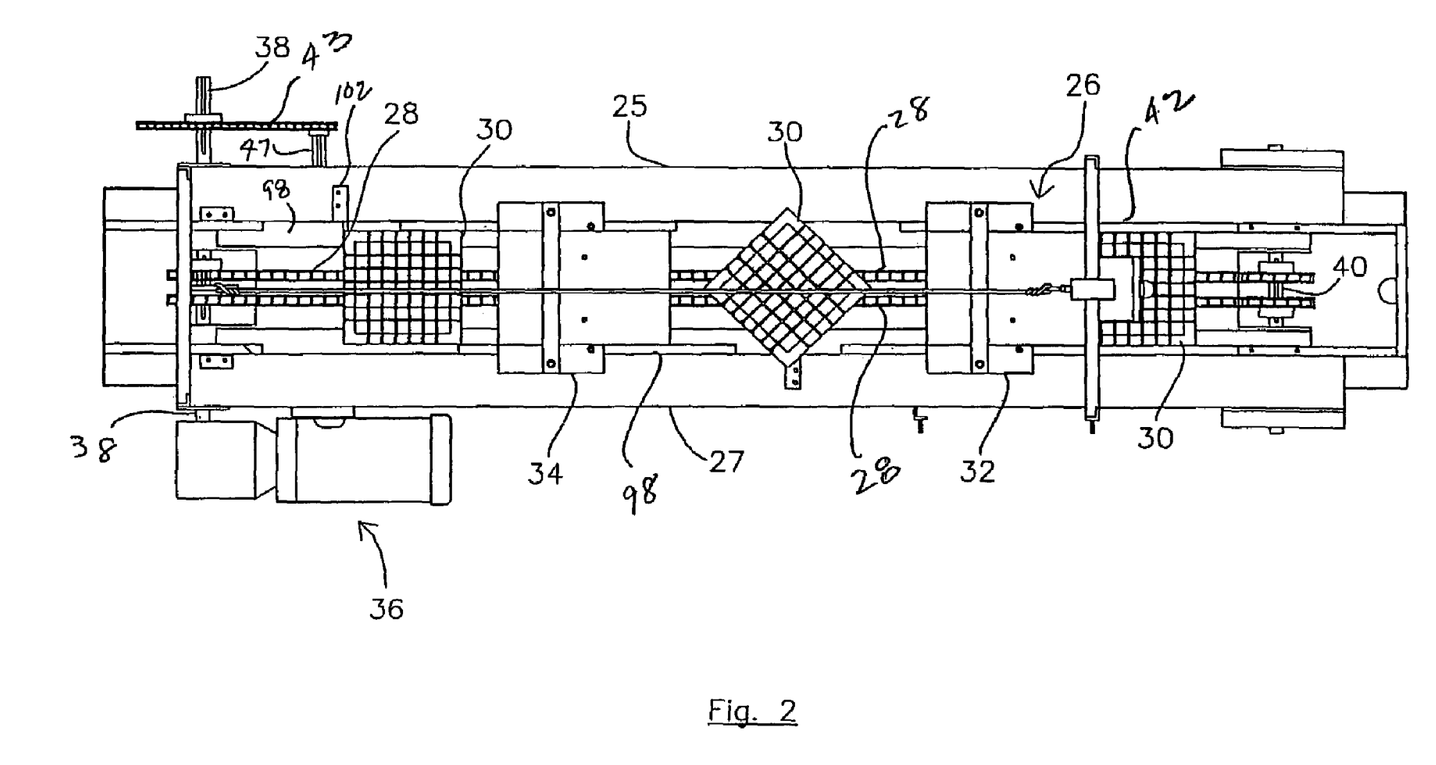
FIG. 2 is a top plan view of the apparatus shown in FIG. 1.

A meat cutting apparatus for producing a plurality of smaller pieces of a selected size and weight from a larger piece of meat constructed in accordance with the present invention is shown in FIGS. 1 and 2.

The apparatus shown includes a supporting frame, indicated generally at 20, having legs 22, horizontal support members 24, and an upper support surface 26 mounted to legs 22. Legs 22 may include wheels such as 23 to permit convenient movement of frame 20 as a whole unit.

Upper surface referred to generally at 26 forms a deck-like structure having a longitudinally extending central opening exposing the upper run of a conventional conveying means, preferably in the form of an endless chain type conveyor 28 which is conventionally mounted on pair of sprockets as describe in detail later herein. Conveyor 28 supports a plurality of product carrier blocks or mandrels 30 which are mounted to the chain conveyor in longitudinally spaced relationship along the selected path of travel of the blocks 30.

The support frame and upper supporting surface are of conventional form and may be constructed in any conventional well-known manner to support any form of conventional conveying means deemed suitable for the purpose of the present invention by one of ordinary skill. Standing alone, the frame and means to move carrier blocks 30 along a defined path form no part of the invention and may consist of many conventional forms and designs suitable to function according to the present invention. Therefore the frame and conveying means will only be briefly described herein to the extent sufficient to enable one of ordinary skill to understand, make and use the present invention.

Upper surface 26 may comprise opposing L-shaped beams 25, 27 fixed in any suitable manner to legs 22 or related frame structure. L-shaped beams 25, 27 support a pair of cutting blocks forming cutting stations, indicated generally at 32 and 34, fixed in longitudinally spaced relationship to one another along the path of travel defined by conveyor chain 28. A conventional electric motor and gear box assembly, indicated generally at 36, and a drive shaft 38 and idler shaft 40, are conventionally connected to conventionally drive conveyor chain 28.

Each cutting block 32 and 34 may be removably fixed to the upper surface 26 via a threaded pin, such as 47, extending into a complimentary hole, not shown, in L-shaped beams 25, 27. A guide rail 42 along which carrier blocks 30 move may be fixed in any conventional manner to upper surface 26. Preferably, cutting blocks 32 and 34 are constructed to be easily removed for cleaning or for replacement to modify the number or spacing of cutting knives desired. In the preferred embodiment shown, cutting blocks 32 and 34 comprise a pair of opposing side panels 46 mounted to a respective one beam of 25 or 27, as noted above, and a center piece indicated generally at 48. Center piece 48, see FIGS. 12-16, may comprise a main body 50 and a pair of outwardly extended wings 52 and 54.

Figure 12:
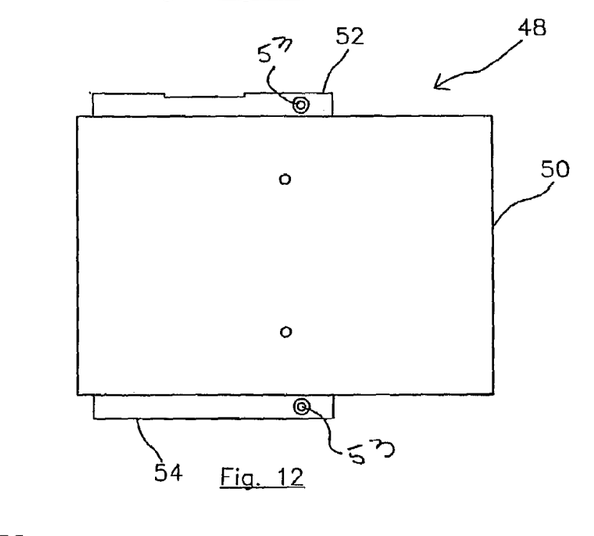
FIG. 12 is a top plan view of a cutting block forming a part of a cutting station mounted along the path of travel of a carrier block in accordance with the present invention as shown in FIG. 1.
Figure 13:
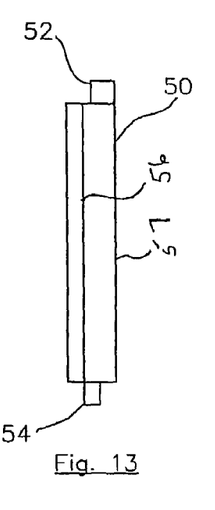
FIG. 13 is an inlet end elevational view of the block shown in FIG. 12.

The bottom surface 57 of body 50 includes a forward portion 56 which functions in cooperation with carrier block 30 to create an inwardly tapered opening for receiving a carrier block 30 loaded with the piece of meat to be cut into sized portions as described in detail later herein.

Wings 52 and 54 include a pair of through holes 58 disposed in a recess 55 and are aligned to removably accept one of a pair of rods 60 mounted at one end to a plate 62. Plate 62 is configured to fit within a recess 55 provided in wing 52 upon fully extending rods 60 through body 50 and holes 58. Rods 60 function to removably secure knife blades, such as 64, in slots 66 disposed in parallel spaced relationship across the width of body 50 as rods 60 pass through aligned holes, such as 68, provided in knife blades 64.

In the preferred embodiment shown, center piece 48 is removably mounted to each side panel 46 via the removable pin 47 extended through a drilled hole in panels 46 which is aligned with a hole or opening 53 provided in each wing 52, 54 and a mating hole, not shown, in L-shaped beams 25, 27. Preferably, side panels 46 are provided with complementary grooves, not shown, on their inwardly facing surfaces which are configured to slidably receive wings 52, 54. The wings are then removably fixed in the grooves to side panels 46 via pins 47. Additionally, a metal strap 57 is extended over the upper surface of body 50 and removably fixed to opposing side panels 46 in any conventional manner, preferably such as by removable fasteners 59.

In this manner, the cutting blocks 32 and 34 are mounted in position in an easily removable fashion for cleaning, repair, or replacement. In the preferred embodiment, wings 52, 54 and the grooves, not shown, provided as described above, are vertically staggered such that each main body 50 in a respective block 32 or 34 will only fit into particular side panels 46. This tends to assure that when the number and spacing of the cutting knives mounted in the body 50 of each block 32 and 34 are different from one another, the body 50 will only fit into the particular side panel 46 mounted on the frame to provide the selected portion sizes of meat desired. This eliminates or tends to reduce a potential for human error in setting up the apparatus to provide the desired result. When the number and spacing of slots 74 and 76 and knives 64 are the same as shown in the preferred embodiment, this feature is not critical.

It should be pointed out that one of ordinary skill will readily understand from the foregoing description that other conventional means may be employed to provide equivalents to cutting blocks 32, 34 which function in a similar manner to accomplish the primary results of the present invention.

Figure 14:
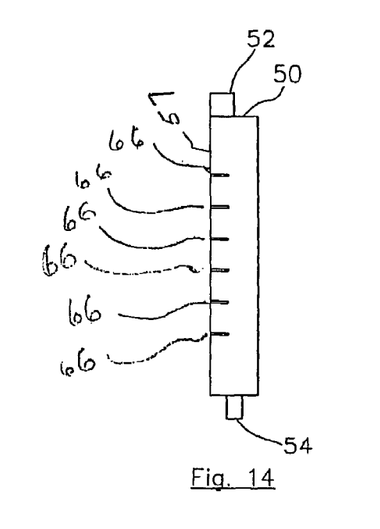
FIG. 14 is an outlet end elevational view of the block shown in FIG. 12.
Figure 15:
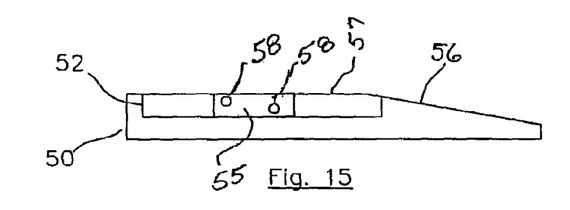
FIG. 15 is a right side elevational view relative to the inlet end of the block shown in FIG. 12.
Figure 16:
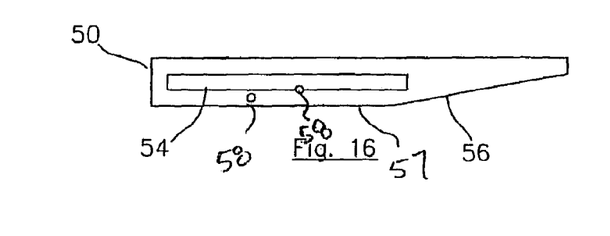
FIG. 16 is a left side elevational view of the block shown in FIG. 12.
Figure 17:
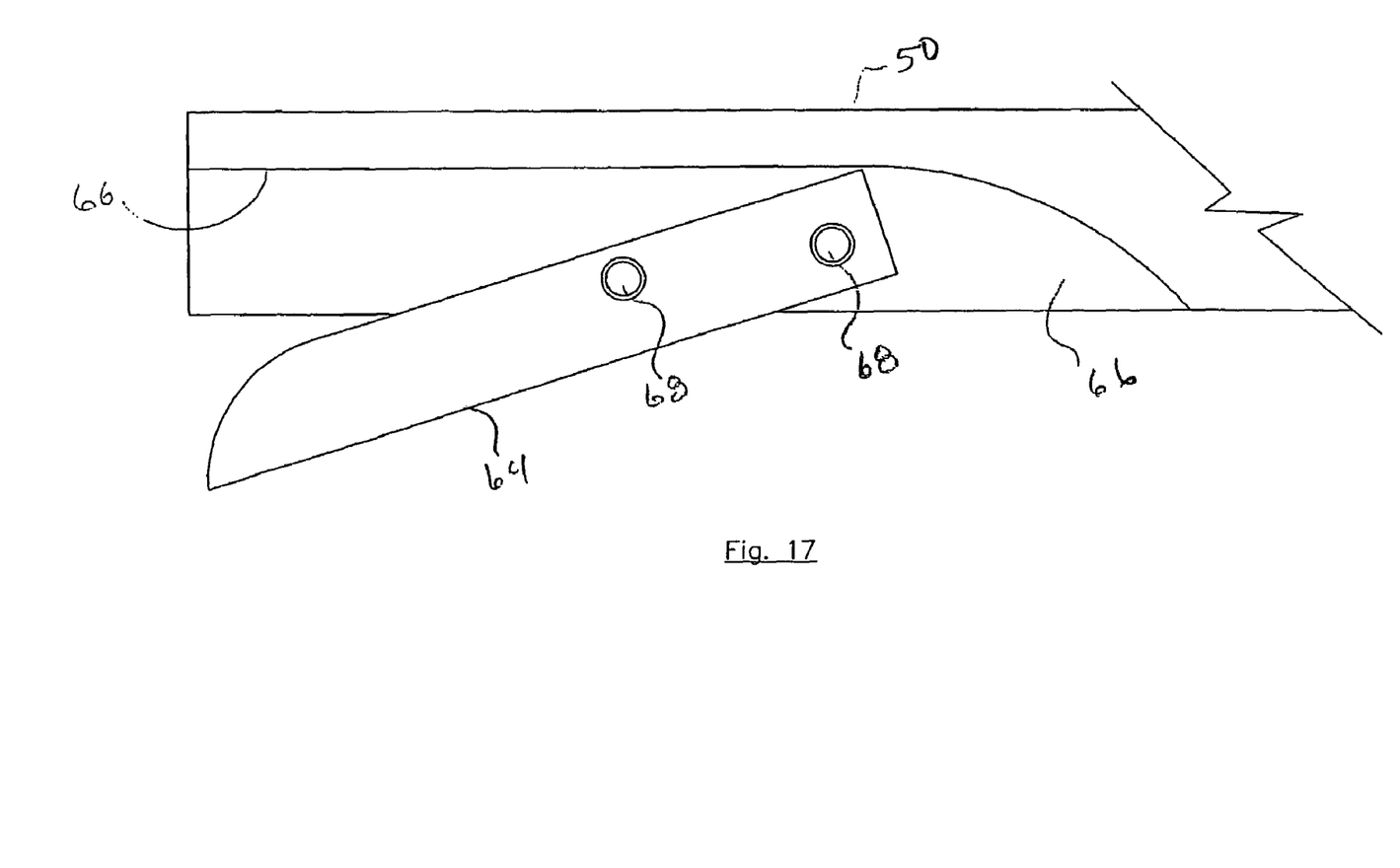
FIG. 17 is a partial side view of the cutting station forming a part of the apparatus shown in FIG. 1 and the block shown in FIG. 12 illustrating the position of a cutting knife mounting therein.
Figure 20:
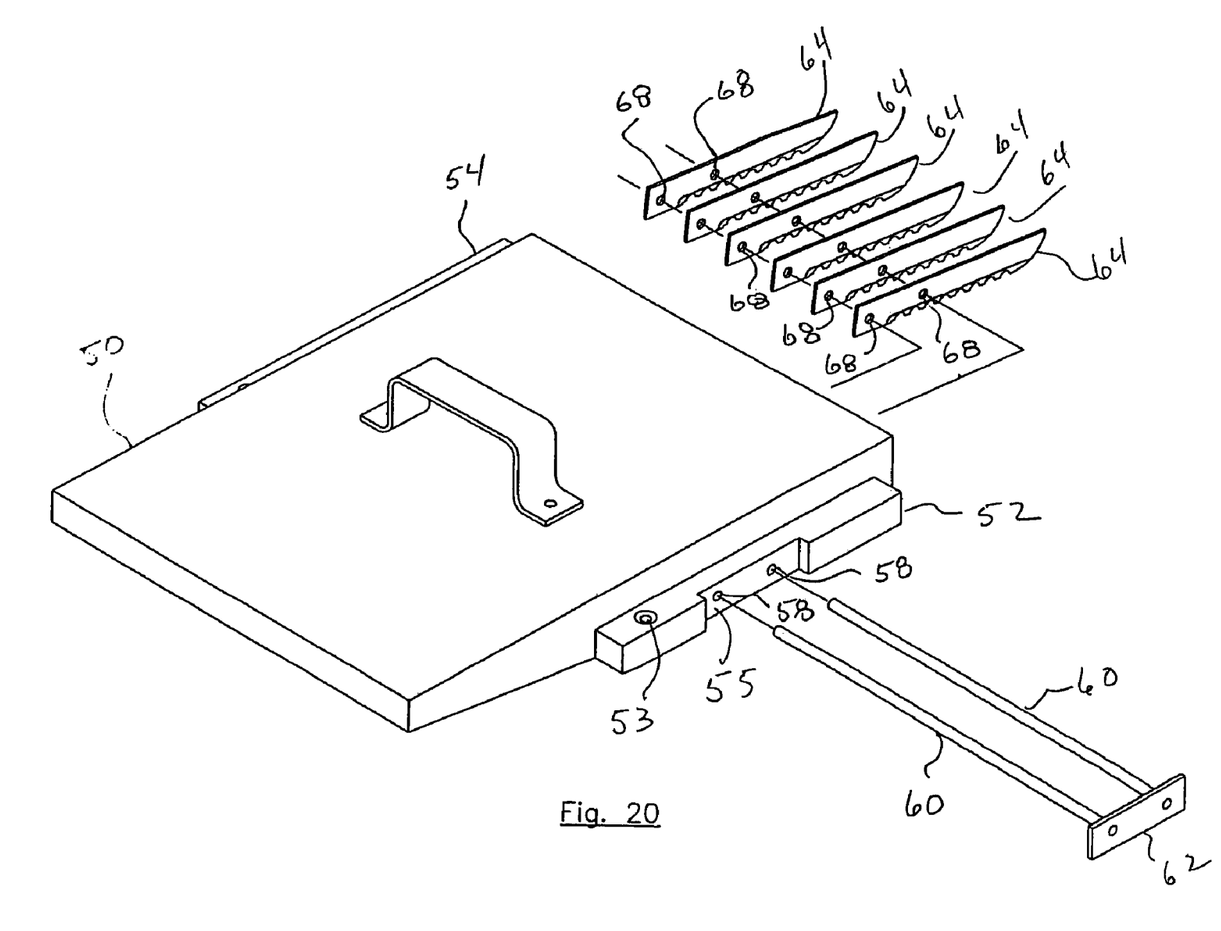
FIG. 20 is an exploded perspective view of a cutting block illustrating a preferred means for removably securing the knife blade within the cutting block.

With specific references to FIGS. 14, 17, and 20, a plurality of knife blades 64 are removably fixed in laterally spaced slots 66 provided in body 50 at an downwardly incline angle determined by the shape of slots 66 and the relative position of holes 58 which receive holding rod 60.

Now referring specifically to FIGS. 3-5 and 7-11, carrier block 30 is shown in detail. Preferably, carrier block 30 comprises a main body portion 70 provided with an upwardly facing or open-top central recess portion 72 and a plurality of intersecting slots, such as shown at 74 and 76. The slots intersect each other at a selected angle. The typical angle would be approximately ninety degrees to provide a generally rectangular or cube-like portion size. However, the angle of intersection could be varied, if desired, to accommodate other shaped portions as will be apparent from the following description.

It should be noted that testing has indicated that the shape of recess 72 need not be square or rectangular, however, for generally irregular shaped initial meat products, such as poultry breasts, a generally square or rectangular shaped recess works very well and is generally preferred to yield very good results relating to efficiency and consistency of the resulting control of portion size and weight.

It is pointed out that it is preferred that slots 74 and 76 extend slightly beyond the bottom or floor 73 of recess 72 to assure a clean and complete cut of the meat product upon entry of the knife blades 64, as described herein, without causing undue wear of the sharp-knife edges which otherwise would engage the floor 73 of recess 72.

As shown in the preferred embodiment herein, there are an equal number of slots 74 and 76 equally spaced from one another. However, it should be noted that the number of slots in any direction and or the spacing may be different than the intersecting slots in the other cutting block so that a variety of sizes and shapes may be readily chosen for the final meat portion created. Of course, the number of knife blades and their spacing in cutting blocks would also be changed to accommodate the number of slots 74 and 76 chosen.

Carrier blocks 30 are removably and rotatably mounted on the chain conveyor 28, which may be a conventional single or dual endless chain assembly. The latter is preferred for additional stability upon which a pivot plate 80 is conventionally mounted via a pair of threaded fasteners 82 fixed at one end to plate 80 and extending downwardly to mate with holes provided in selected areas of cross members, such as shown at 84, carried by chain conveyor 28. However, other conventional means well-known to those skilled in the art may be used to mount the pivot plate or carrier blocks to a conveyor to accomplish equivalent results without departing from the present invention.

Figure 3:
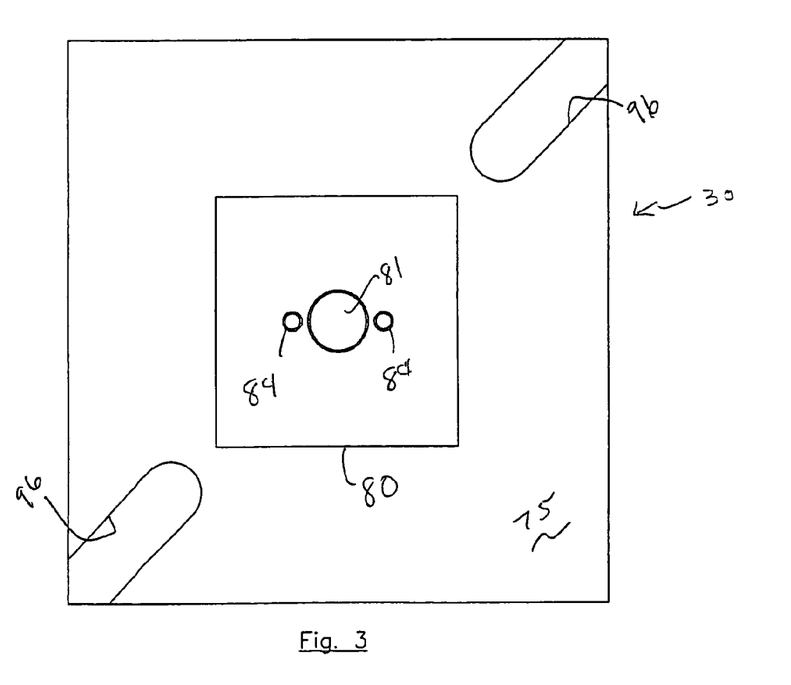
FIG. 3 is a bottom plan view of a carrier block forming part of the apparatus shown in FIG. 1.
Figure 4:
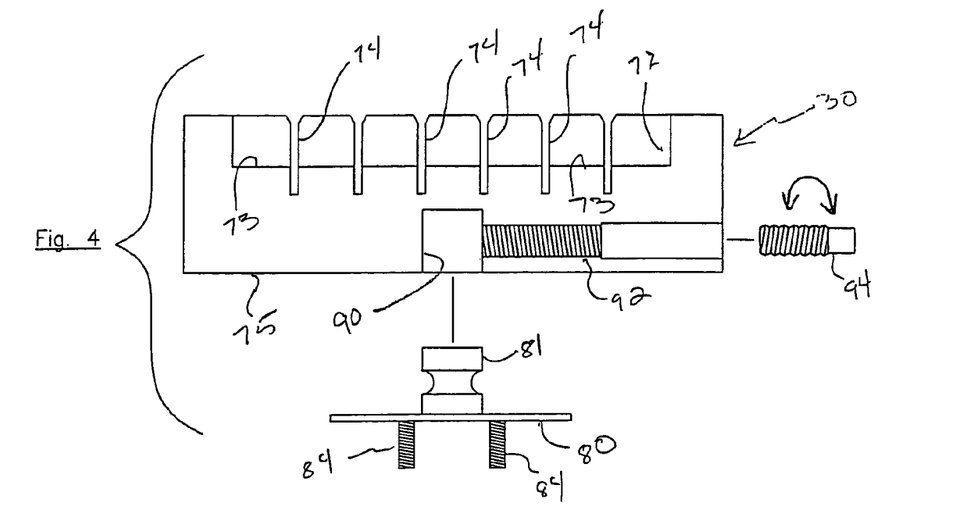
FIG. 4 is an exploded view of the carrier block shown in FIG. 3 and illustrating a side view of the pivot block which mounts the carrier block to the conveyor forming a portion of the apparatus of FIG. 1.
Figure 5:
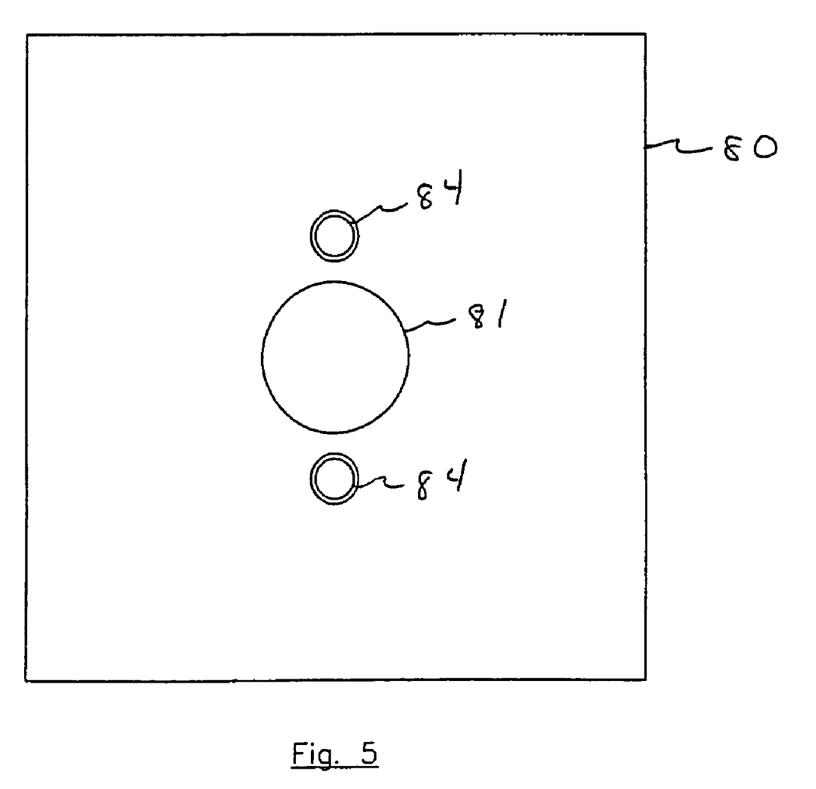
FIG. 5 is a bottom plan view of the pivot block shown apart from the remainder of the apparatus illustrated in FIGS. 3 and 4.
Figure 6:
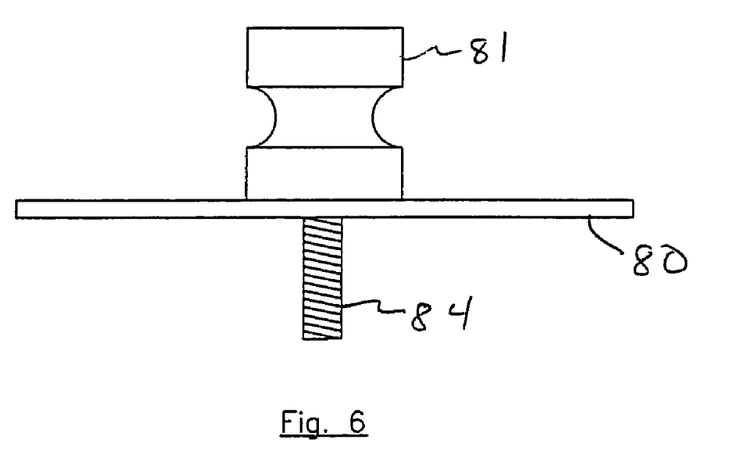
FIG. 6 is a side elevational view of the carrier block illustrated on FIG. 5.
Figure 7:
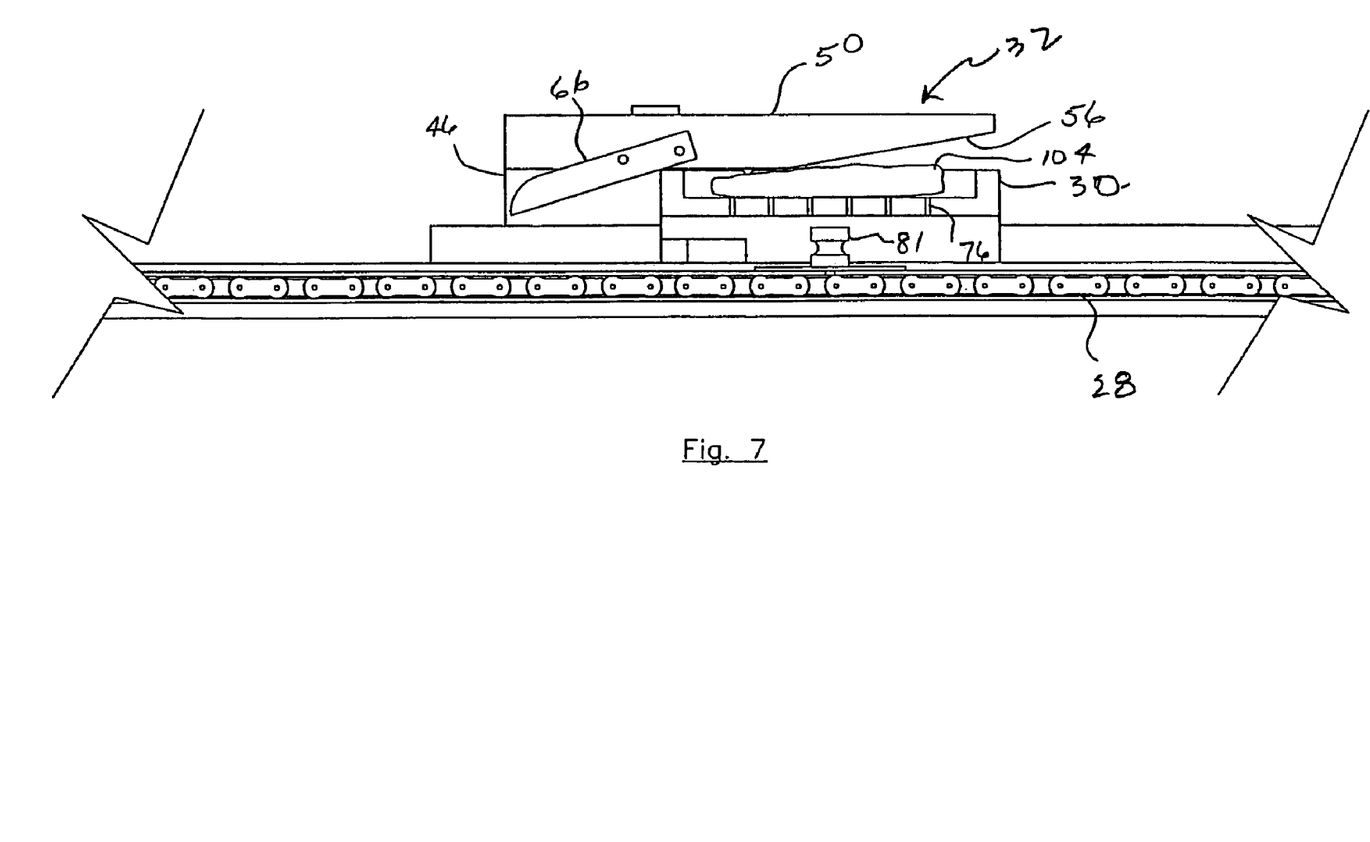
FIG. 7 is a partial side elevational view of the apparatus shown in FIG. 1 illustrating a carrier block on the conveyor entering a cutting station.

Now referring specifically to FIGS. 3 and 4, a preferred manner for rotatably mounting cutting blocks 30 to conveyor chain 28 is shown. The bottom surface 75 of cutting block 30 includes a centrally disposed bore 90 which is intersected by a threaded bore 92 configured to removably receive a horizontally extending set screw 94.

Pivot plate 80 is provided with an upwardly extending pivot post 81 fixed in any suitable manner to plate 80 and adapted to be rotatably received within bore 90 in carrier block 30.

Upon mounting carrier block 30 upon pivot plate 80 with post 81 disposed within bore 90, carrier block 30 may rotate about post 81 as it is carried along conveyor chain 28. Set screw 94 is threadably disposed in bore 92 sufficiently to engage and thereby apply a slight degree of force upon post 81 to control the freedom of pivotable movement of carrier block 30 about post 81. It is desirable that some significant degree of force be necessary to cause the carrier block to rotate as compared to being free to rotate at will. It is relatively easy to manipulate set screw 94 to provide a relatively light interference engagement between pivot post 81 and set screw 94 to provide a reasonable degree of stability of carrier block 30 upon post 81 and yet permit block 30 to be rotated through the desired angle as described below herein to accomplish the purpose of the present invention.

In the preferred embodiment shown, the bottom surface 75 of carrier block 30 also is provided with a pair of grooves 96 extending inwardly from opposing corners thereof. Grooves 96 form part of a turning or rotating actuating means to cause the selective rotation of carrier block 30 through a selected angle after passing through the first cutting block 32 and before entry into the second cutting block 34 and subsequently prior to passing into first cutting block 32 on a repeat run of the cutting cycle.

Upon mounting a carrier block 30 upon pivot post 81 of a mounting plate 80, it should be noted that blocks 30 slidably ride upon a pair of laterally spaced guide rails 42 fixedly mounted on respective one of L-shaped beams 25 and 27 as best seen in FIGS. 1 and 2.

Carrier block 30 is initially aligned on post 81 such that a selected one of slots 74 or 76 are parallel and aligned with the knife blades 66 in the first cutting block 32. Then set screw 94 is tightened to assure this alignment is maintained unless a sufficient force is applied to cause rotation of carrier block 30 on post 81.

As a carrier block 30 emerges from the first cutting block 32, a horizontally extending rod 100 mounted on a bracket 102, which in turn is fixed to L-shaped beam 27, is disposed to engage one of the corner grooves 96 in the bottom surface of carrier block 30. This engagement causes carrier block 30 to rotate through the selected ninety degree angle to align the intersecting slots 76 parallel with the knife blades 64 in the second cutting block 34.

In this manner the piece of meat product disposed in recess 72 of carrier block 30 is sliced in two ninety degree removed directions to create the size and weight portions desired.

This is best illustrated in FIGS. 7-11 wherein the meat product 104 is caused to move past and engage the knife blades 64 to create a plurality of slices through the meat product in a direction parallel to the path of travel.

Figure 8:
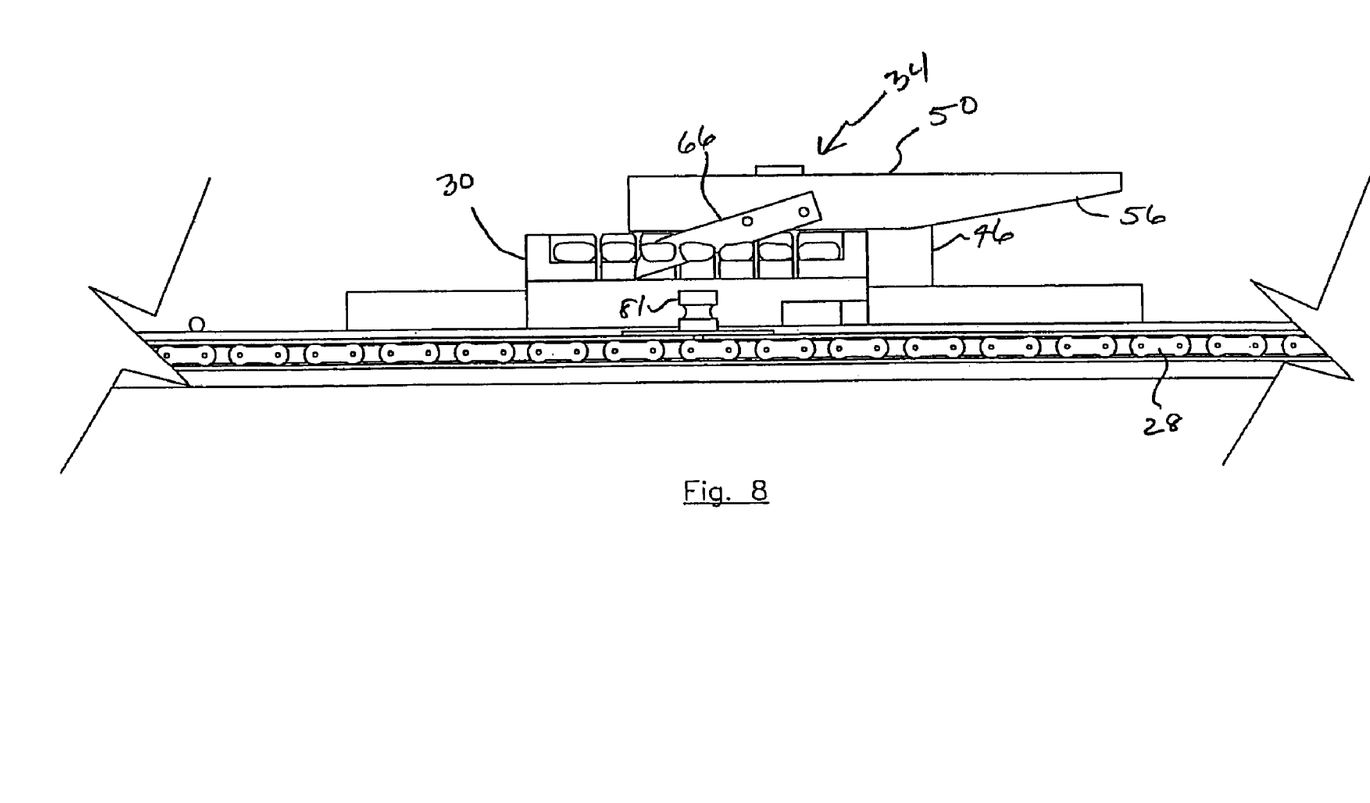
FIG. 8 is a similar view to the view shown in FIG. 7 illustrating the carrier block at an advanced position within a cutting station.
Figure 9:
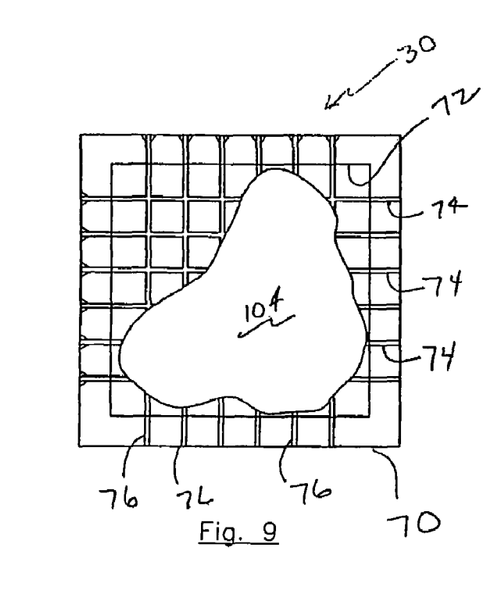
FIGS. 9-11 are top plan views of the carrier block shown in the preceding Figures diagrammatically illustrating the two stage cutting of a piece of meat loaded in the carrier block as it would occur in the preferred embodiment shown in FIG. 1.
Figure 10:
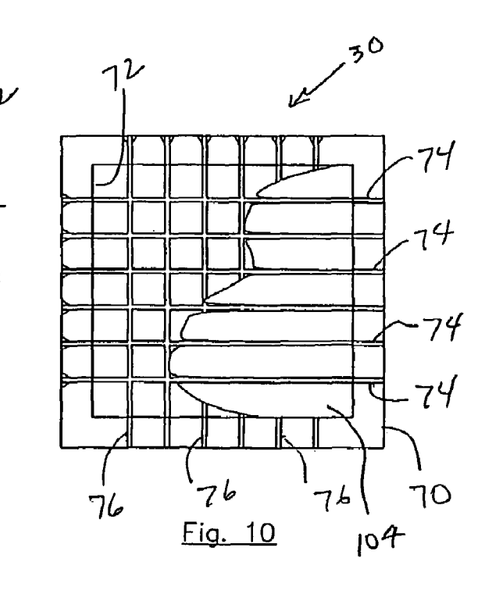

The nature of the cutting action achieved is diagrammatically illustrated in FIGS. 7-11. FIG. 9 illustrates the initial loading a piece of irregular shaped meat 104, a filleted poultry breast, into recess 72 of carrier block 30. In FIG. 10, the initial cut parallel to slots 74 has been made as carrier block 30 passes through cutting station 32 and has been engaged by knife blades 64.

It should be noted that the meat product 104 is confined within recess 72 on all three sides and by the bottom surface of recess 72 and the lower surface 57 of cutting block 32 during the cutting action. Further, as the knife blades 64 engage the meat product 104, the meat product tends to be pushed rearwardly into contact with the rearward wall of recess 72 and tends to be compressed into the confined area defined by the recess 72 and bottom wall surface 57 of main block 50. Upon emerging from cutting block 32 and being rotated through ninety degrees as described herein, a similar cutting action occurs as carrier block 30 passes through cutting block 34, as seen in FIG. 8, wherein knife blades 64 slice through the meat product 104 at substantially a right angle to the cuts made in first cutting block 32. Cutting block 34 is essentially identical in construction to cutting block 32. However, as noted earlier, the number and spacing of knife blades 66 may be modified to provide for a different size or shape of the final portion sizes of meat produced.

Figure 11:
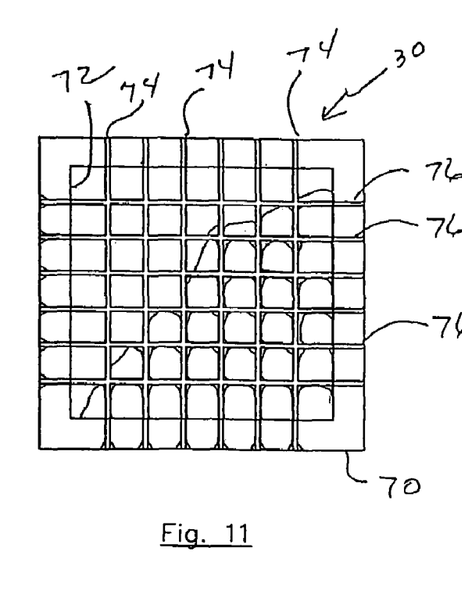

The resulting cuts through the meat product 104, as shown in FIG. 11, provide a plurality of selectively sized small portions of meat product from the irregular shaped initial piece of meat in a highly efficient manner with relatively few pieces of different size and weight. The relatively few undersized pieces may be sorted out and used for different food purposes, albeit typically deemed less valuable than the substantially consistently sized pieces of the desired shape and weight.

The majority of the resulting portions of meat as shown in FIG. 11, are notably very regular in size and weight. This is accomplished by controlling to a high degree the volume into which the meat is confined as it is being cut in first one direction and then in another direction which most often would be approximately at ninety degrees from the initial direction of cuts.

With reference to FIGS. 1, 2, 19 and 20, conveyor chain assembly 28 may be driven in any suitably conventional manner well-known to those skilled in the art and therefore a detailed description is not necessary for one of ordinary skill to understand how to make and use the invention in view of the description herein.

Figure 19:
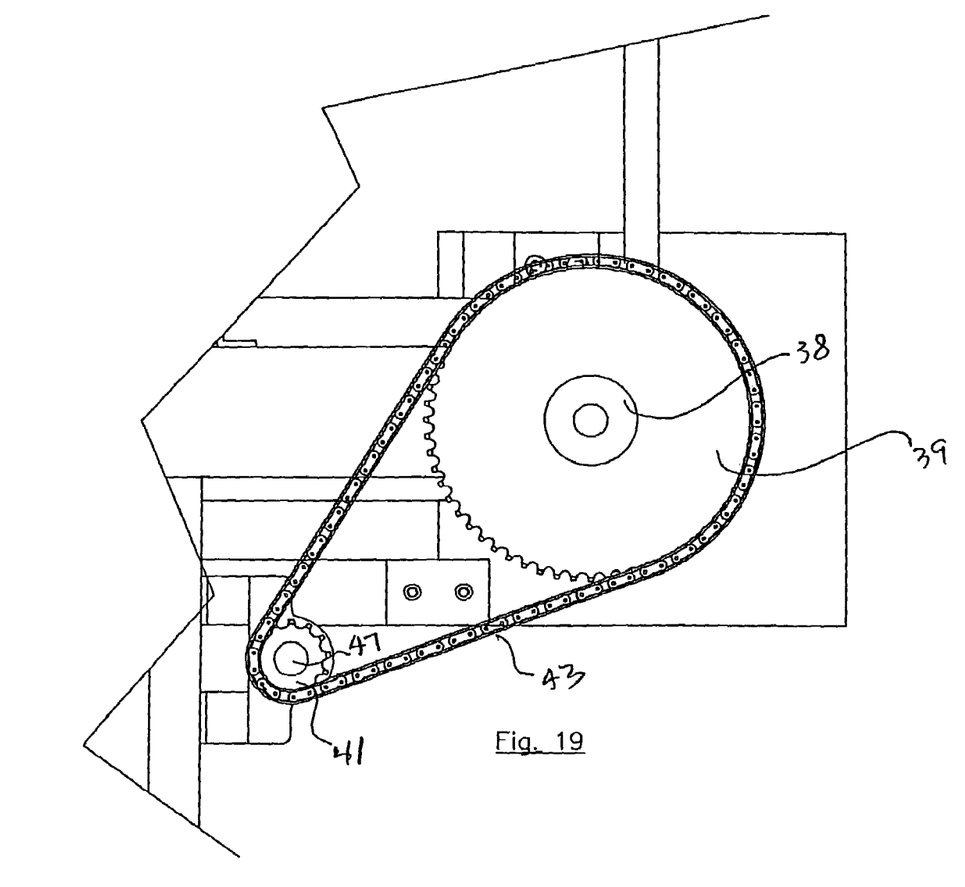
FIG. 19 is a partial sectional view through the housing of a drive assembly forming a part of the apparatus shown in FIG. 1 illustrating a conventional means to drive the conveyor shown in FIG. 1 as well as a meat removal device such as shown in FIG. 18.

A conventional electric motor and gear box assembly such as at 36 may be employed to drive shaft 38 which is operatively connected to a pair of sprockets, not shown, which support one end of endless conveyor chain 38. The opposing end of chain assembly 28 may be mounted about a pair of sprockets mounted to an idler shaft, such as 40.

Figure 18:
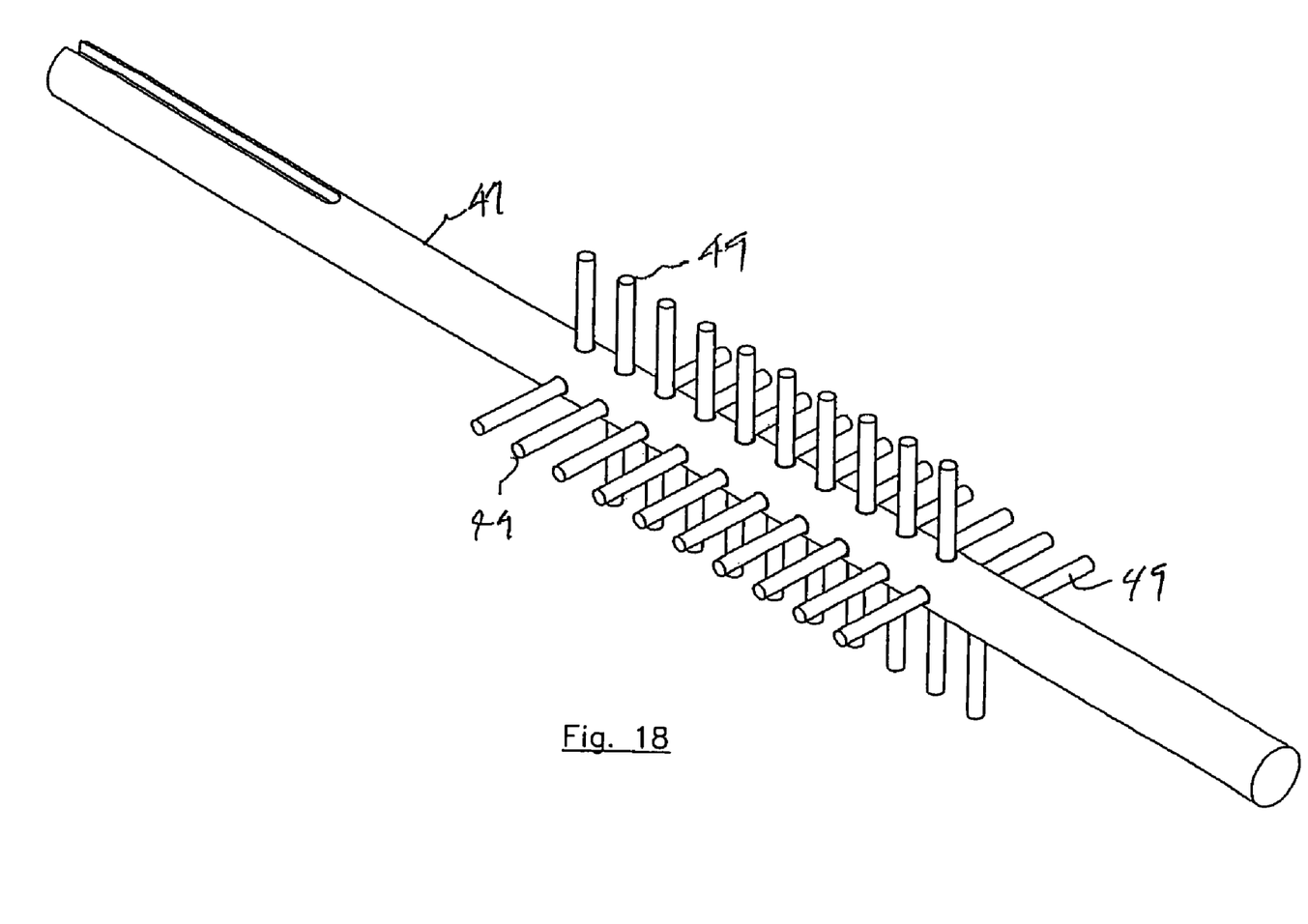
FIG. 18 is a perspective view of a meat removal device which may be optionally used in connection with the apparatus shown in FIG. 11.

A driven sprocket 39 may be used and connected to a smaller sprocket 41 via a conventional chain 43, if desired, in order to drive a shaft 47 carrying a plurality of elastic, radially extending fingers, such as at 49. Shaft 47 carrying fingers 49, not shown in FIG. 1, may be usefully employed when mounted in the path of carrier blocks 30 as they pass under the left hand end of chain conveyor 28 such that the elastic fingers engage recess 72 to assure all the cut portions of meat have fallen out of recess 72. The final cut portions falling from recess 72 may be collected in any conventional manner for further processing, including a moving conveyor suitably mounted under chain conveyor 28.

In view of the foregoing description, it should be readily understood that the apparatus and method for producing a plurality of selectively sized portions of meat from a larger initial piece of meat in accordance with the present invention represents a significant advance in the food handling field and contributes to higher efficiency with lower labor cost.

It should be noted that the tapered inlet opening of cutting blocks 32 and 34 provided by tapered surface 56 is significant if the original meat product 104 loaded into a recess 72 has an initial height which extends above the height of recess 72. The tapered inlet tends to initially receive the piece of meat and gradually force it downward so as to better fit with the confined volume defined between recess 72 and lower surface 57 of main body 50 without a tendency to rip or tear the meat.

Further, it is pointed out that the components comprising the apparatus should constitute materials which are suitable for the food processing industry and meet all governmental requirements. Typically stainless steel and synthetics such as delrin are often usefully employed.

While certain preferred embodiments of the present invention have been disclosed in detail, it is to be understood that various modifications may be adopted without departing from the spirit of the invention or scope of the following claims.

The invention claimed is:

1. An improved automated apparatus for cutting a piece of meat into a plurality of portions of a selected size and shape, the apparatus including at least one carrier block mounted for travel on a conveyor along a selected path and for rotation about a vertical axis relative to said path of travel, a recess in the carrier block having an uncovered, open top and a selected shape and volume;

a plurality of slots in said carrier block intersecting said recess and comprising: a first set of laterally spaced slots disposed substantially parallel to the selected path of travel of said carrier block and a second set of slots intersecting said first set of slots at a predetermined angle; the improvement comprising:

a first stationary cutting station mounted along said selected path of travel, the first cutting station including a first tapered channel opening defined by the conveyor and a stationary first tapered surface on the first cutting station facing the conveyor, the first cutting station also including a first plurality of stationary knives mounted to the first cutting station and spaced from the conveyor for receiving said uncovered carrier block in the first tapered opening, which defines a confined volume in cooperation with said recess in said carrier block, and then receiving the carrier block between the conveyor and stationary cutting edges formed only on edges of the knives that are closest to the conveyor, the knives being mounted in a predetermined laterally spaced relationship to one another, extending parallel to said path of travel of said carrier and aligned with the first set of laterally spaced slots;

(b) a second stationary cutting station mounted in longitudinally spaced relationship with the first cutting station along said selected path of travel, the second station including a second tapered channel opening defined by the conveyor and a stationary second tapered surface on the second cutting station facing the conveyor, the second cutting station also including a second plurality of stationary, knives mounted to the second cutting station and spaced from the conveyor for receiving said uncovered carrier block in the second tapered opening, which defines a confined volume in cooperation with said recess in said carrier block, and then receiving the carrier block between the conveyor and stationary cutting edges formed only on edges of the knives that are closest to the conveyor, the knives being mounted in a predetermined laterally spaced relationship to one another, extending parallel to said path of travel of said carrier and aligned with the second set of laterally spaced slots; and (c) means to rotate said uncovered carrier block between a first position, defined by having said first set of slots aligned to receive said cutting edges in said first cutting station during passage of said carrier block through the channel in said first cutting station, and a second position defined by having said second set of slots aligned to receive said cutting edges in said second cutting station during passage of said carrier block through the channel in said second cutting station, whereby a meat product disposed in said recess may be cut into a plurality of smaller pieces having a shape and size dependent upon the lateral spacing and angle of intersection of said first and second sets of slots and the number and spacing of said cutting edges.

2. A method for automated processing of a piece of meat to produce a plurality of smaller pieces, each having a predetermined size and shape, comprising the steps of:

(a) loading a piece of meat into an uncovered, open top recess of a carrier mandrel mounted for travel on a conveyor, said recess having a selected shape and depth bordered by at least three sides and a plurality of slots having a depth at least equal to the depth of said recess, said slots comprising a first set of slots arranged in spaced parallel relationship to one another and a second set of slots arranged in spaced parallel relationship to one another and intersecting said first set of slots at a pre-selected angle;

(b) moving said uncovered carrier mandrel on a selected path of travel through a first stationary cutting station having a first tapered channel opening defined between a stationary first tapered surface of the first cutting station and the conveyor, and a plurality of laterally spaced, stationary knives mounted to the first cutting station downstream of the first tapered surface and having knife edges disposed in said path of travel facing only the recess and aligned parallel with said first set of slots in said mandrel to effect a first plurality of parallel cuts through a piece of meat disposed in said recess when the carrier mandrel is driven by the conveyor past the stationary first tapered surface and then through the stationary knife edges;

(c) rotating said uncovered carrier mandrel through the pre-selected angle to align said second set of slots in said carrier mandrel parallel to the selected path of travel; and (d) continuing to move said uncovered carrier mandrel along said selected path of travel through second stationary cutting station having a second tapered channel opening defined between a stationary second tapered surface of the second cutting station and the conveyor, and a plurality of laterally spaced, stationary knives mounted to the second cutting station downstream of said second tapered surface and having knife edges disposed in said path of travel facing only the recess and aligned parallel with said second set of slots in said mandrel to effect a second plurality of cuts through the pieces of meat confined in said recess when the carrier mandrel is driven by the conveyor past the stationary second tapered surface and then through the stationary knife edges to produce a plurality of smaller pieces of meat having substantially a similar size, shape and weight; and (e) removing the plurality of smaller pieces of meat in said recess.

* * * * *